April 20, 1943.　　F. C. WALLACE　　2,316,918
KNOB DEVICE
Original Filed Dec. 13, 1940

Inventor
Frank C. Wallace.

Attorney.

Patented Apr. 20, 1943

2,316,918

UNITED STATES PATENT OFFICE 2,316,918

KNOB DEVICE

Frank C. Wallace, Los Angeles, Calif., assignor to Monogram Manufacturing Co., Los Angeles, Calif., a corporation of California Original application December 13, 1940, Serial No. 369,917. Divided and this application April 6, 1942, Serial No. 437,751

3 Claims. (Cl. 16—121)

My invention, which is divisional of my co-pending application Serial No. 369,917, filed December 13, 1940, which matured into United States Letters Patent Number 2,282,412, dated May 12, 1942, relates to pull devices and, in its more particular aspects, it has to do with knobs adapted to be secured in mounting holes provided in drawers or the like by means of radially expansible prongs forced into engagement with the side walls of the hole by an expander.

It is an object of this invention to provide a knob device of this character which is extremely economical of manufacture, of which the parts may not be accidentally separated or the assembly loosened, which is peculiarly adaptable for being molded of plastics, which is light in weight and which requires a minimum of plastic material for its manufacture.

How the foregoing as well as other objects and advantages inherent in my invention are attained will become clear from the following detailed description of a presently preferred embodiment thereof, for which purpose I shall now refer to the accompanying drawing, in which.

Figure 4:
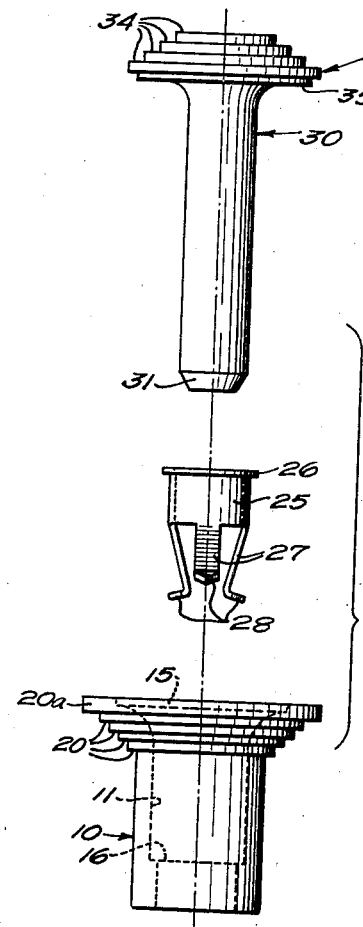
Fig. 4 shows, in elevation, the various components of the device separated.
Figure 3:
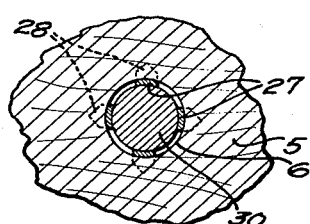
Fig. 3 is a section on line 3—3 of Fig. 2.

Referring now to the drawing, I show at 5 an object to which my knob device is applied and which typically may be a drawer, door or the like, in which I provide a hole 6.

My knob consists of a molded body 10 having a longitudinal bore 11 flaring outwardly at and adjacent its top end 12, said bore terminating in a straight side wall portion 15 providing a socket for the reception of a flange formed integral with the head of the expander member to be later described. The lower portion of the bore is of relatively reduced diameter to provide an annular shoulder 16. The top portion of the body around the flared portion of the bore is of relatively increased diameter and presents relatively narrow annular stepped portions 20 of gradually varying diameter to provide an efficient hand surface.

Figure 1:
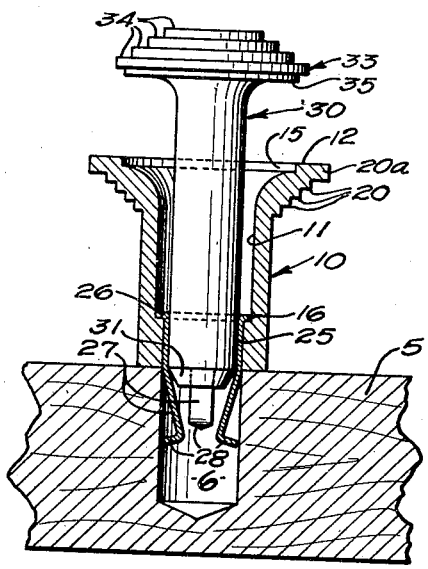
Fig. 1 is a longitudinal sectional view showing the device in course of being mounted on an object.
Figure 2:
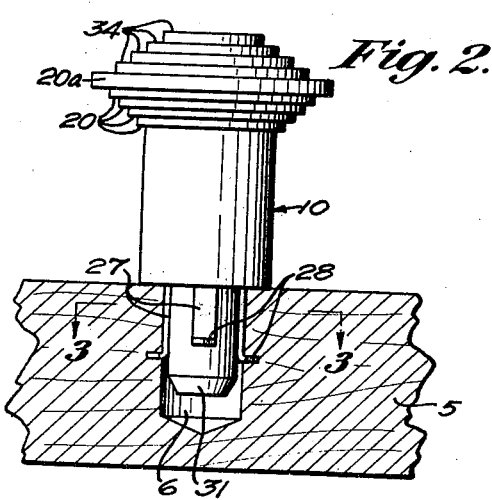
Fig. 2 is an elevational view showing the device in mounted position on an object, the latter being shown in section.

For securing the body to the object 5, I provide a tubular member 25 having an annular flange 26 seating against shoulder 16 and presenting downwardly disposed flexible fingers 27, each terminating at its lower end in an outwardly disposed, relatively sharp prong 28 adapted to engage in the side wall of the hole 6. When being mounted, the member 25 is inserted in the bore 11 from the top end with the fingers 27 in the convergent position shown in Figs. 1 and 4. Next, as best shown in Fig. 1, I insert the expander generally designated by the numeral 30, into the bore 11. This expander has a beveled lower end 31 to facilitate insertion in the tubular member 25 and as it is forced into the latter its side wall acts to expand the fingers to force their ends 28 to become embedded in the side wall of the hole 6.

The top end of the expander member is headed at 33 and is provided with stepped portions 34 to correspond with the steps 20 of the body. These steps 34 are relatively shallow, being preferably of the order of ⅛ inch, and each successive step is sufficiently smaller than the next lower step as to prevent the user obtaining a sufficiently firm grip on the headed end to remove or loosen the expander with respect to the bore. Immediately beneath the head 33, I provide an annular flange 35 of relatively smaller diameter and whose side wall is adapted to fit snugly against the side wall of the socket 15 so that the head 33 may rest flatly against the relatively wider top step 20a of the body portion.

The broad concept of my invention, as defined by the appended claims, of course may be carried out in structures varying from that herein specifically described, so that the details which I have hereinbefore employed to illustrate an adaptation of my invention are not to be taken as limitative.

I claim:

1. A pull comprising a hollow knob having a neck portion adapted to be secured at its lower end to an object, and a relatively large head, said head consisting of a lower portion presenting an upwardly opening socket, a cap presenting a depending flange fitting into the socket, and means for securing the neck portion of said object, including a longitudinally split tube projecting from the neck portion and presenting radially expansible prongs engageable in said object, and an expander pin depending from the cap and having a beveled lower end for insertion in the tube to radially expand the prongs.

2. A device of the class described comprising a lower knob portion having a longitudinal bore flaring outwardly at and adjacent its top end, the lower end of said bore being of relatively reduced diameter to form an upwardly facing shoulder, an expansible sleeve mounted in the said lower end of the bore and projecting therebelow, a flange on the top end of said sleeve engaging said shoulder, and an upper knob portion having a bottom flange fitting into and engaging the side wall of the top end of said bore, said knob having a depending portion of reduced diameter extending longitudinally of the bore and into said sleeve whereby to expand the latter.

3. A pull adapted to be secured to an object having a mounting aperture therein, including a circular body having a base disposed against the object, said base flaring outwardly at or adjacent its top end whereby to provide a handle portion, a longitudinal bore through the base, said bore presenting a flared portion of relatively increased diameter adjacent its top end and terminating in a straight side wall portion providing an outwardly opening socket, tubular means secured at one end in the lower end of the bore and having an expansible portion projecting therebelow, and an expander mounted longitudinally of the bore and cooperating with said expansible portion whereby to expand the same into engagement with the side wall of the hole, said expander having a stem portion of smaller diameter than the bore and a head having a depending flange snugly fitting into the socket, the top surface of the expander being formed of steps gradually decreasing in diameter towards its top end whereby to provide a surface which may not be sufficiently firmly gripped by an operator to permit of moving the expander longitudinally outwardly of the bore.

FRANK C. WALLACE.